United States Patent
Bertram et al.

(10) Patent No.: US 6,679,344 B1
(45) Date of Patent: Jan. 20, 2004

(54) METHOD AND DEVICE FOR ENERGY DISTRIBUTION IN A MOTOR VEHICLE

(75) Inventors: Torsten Bertram, Duesseldorf (DE); Clemens Schmucker, Tamm (DE); Rolf Maier-Landgrebe, Kernen (DE); Torsten Baumann, Massenbachhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,620

(22) PCT Filed: Apr. 1, 1999

(86) PCT No.: PCT/DE99/00987
§ 371 (c)(1),
(2), (4) Date: May 24, 2000

(87) PCT Pub. No.: WO00/01558
PCT Pub. Date: Jan. 13, 2000

(30) Foreign Application Priority Data

Jun. 30, 1998 (DE) .......................... 198 29 150

(51) Int. Cl.$^7$ .............................. B60K 41/00
(52) U.S. Cl. ....................... 180/65.3; 701/99
(58) Field of Search ................. 180/65.1, 65.2, 180/65.3, 65.4; 701/22, 29, 99, 70

(56) References Cited

U.S. PATENT DOCUMENTS

| | | | |
|---|---|---|---|
| 4,335,429 A | * | 6/1982 | Kawakatsu ............... 180/65.2 |
| 5,351,776 A | | 10/1994 | Keller et al. |
| 5,426,589 A | * | 6/1995 | Kitagawa et al. ............. 701/99 |
| 5,490,064 A | * | 2/1996 | Minowa et al. ............... 701/99 |
| 5,608,308 A | * | 3/1997 | Kiuchi et al. .............. 180/65.2 |
| 5,664,635 A | * | 9/1997 | Koga et al. ................ 180/65.3 |
| 5,697,466 A | * | 12/1997 | Moroto et al. ............. 180/65.2 |
| 5,698,905 A | * | 12/1997 | Rüthlein et al. ........... 180/65.4 |
| 5,991,669 A | * | 11/1999 | Dominke et al. ............. 701/70 |
| 6,038,500 A | * | 3/2000 | Weiss ..................... 701/22 |
| 6,052,632 A | * | 4/2000 | Ihoshi et al. .................. 701/29 |
| 6,073,712 A | * | 6/2000 | Buglione ................... 180/65.2 |
| 6,105,697 A | * | 8/2000 | Weaver ................... 180/65.3 |

FOREIGN PATENT DOCUMENTS

| | | |
|---|---|---|
| DE | 197 09 317 | 9/1998 |
| DE | 197 09 317 | 10/1998 |
| DE | 197 45 849 | 4/1999 |

OTHER PUBLICATIONS

Kiencke et al., *Open Systems and Interfaces for Distributed Electronics in Cars (OSEK)*, SAE Technical Paper Series, Jan. 1, 1995, pp. 71–78.
Kiencke et al., *OSEK/VDX—Approaching an Industry Standard for Open–Ended Architectures for Distributed Control Units in Vehicles*, Ingenieurs de L'Automoile, Apr. 1998, pp. 42–45.

* cited by examiner

Primary Examiner—Frank Vanaman
(74) Attorney, Agent, or Firm—Kenyon & Kenyon

(57) ABSTRACT

A method and a device are presented for power distribution in a motor vehicle having at least one battery and at least one generator. In this case a hierarchical control structure is used which has a higher-level component and a component on a lower level for the control of the at least one generator and the at least one battery. Between the higher-level and the lower-level components, specified interfaces with specified communication relations are provided. Communication relations are specified as instructions which are to be executed by the components to which they are addressed. Requests should be met by the components to which they are addressed, and queries are answered by the queried components. The power or voltage is set between the component of the at least one generator and the higher-level component as an instruction. The potential for power production of the generator is to be transmitted as a query, and the electrical power potential of the battery is to be transmitted between the component of the at least one battery and the higher-level component as a query.

18 Claims, 5 Drawing Sheets

METHOD AND DEVICE FOR ENERGY DISTRIBUTION IN A MOTOR VEHICLE

BACKGROUND INFORMATION

The present invention relates to a method and to a device for power distribution in a motor vehicle.

In known control systems of motor vehicle components, the software is structured according to functions. It may occur that different functions access the same actuating elements. Interchangeability of software parts is possible only at considerable expense. Modular development is not supported.

In order to improve this situation, German Published Patent Application No. 41 11 023 (corresponding to U.S. Pat. No. 5,351,776), for example, describes a control system and a control device making it possible to control the entire vehicle and having a hierarchical instruction structure for the control tasks. The control structure described in that patent includes coordination elements which convert an instruction originating from a higher hierarchical level into instructions for elements on a lower hierarchical level. The contents of the instructions transmitted from the top down in the hierarchical structure represent physical values which determine the interfaces between the different hierarchical levels. The described interfaces are oriented so as to agree with the physical conditions of the vehicle movement, in particular of the power train and the brake. No further possibilities of a vehicle control taking into consideration the power distribution in the vehicle's electrical distribution system is described.

The installed electrical power may in some cases exceed 15 kW in the future. In the worst case, 7 kW continued electrical power is possible (this represents the extreme possible combination of loads with maximum capacity of the individual loads in normal operation). Additional actuation of short-term loads may cause this value to exceed 10 kW. When electrical motors and/or incandescent lamps are switched on at the same time, an additional, non-negligible output peak occurs which is caused by starting currents.

These numerical values clearly show the requirements imposed upon a vehicle's electrical distribution system of the future. The battery or batteries and generator are designed so that the vehicle can be used at all times. This means that the electrical output is balanced on the average, with the boundary requirement that the battery charge state may not drop below a critical value so that the engine can be started at any time. The specified voltage limits may not be exceeded nor may the voltage fall below these limits so that load failures (e.g., control device failure due to insufficient voltage) may be avoided. Drive concepts of the future, such as start-stop systems or momentum-utilizing systems increase the demands made upon the vehicle electrical distribution system further, since a generator coupled to the engine produces no energy when the engine stops.

The production of electrical power also affects a vehicle's fuel requirements. The production of 100 W of electrical energy raises the fuel requirements by approximately 0.17 liters/100 km. A 50-kg increase in the weight of the vehicle results in the same additional consumption. A reduction in the vehicle's fuel requirement and at the same time significant increase in the electrical power is only possible if the efficiency of the power production, distribution and utilization is improved on the one hand while the interaction between the power train and the vehicle electrical distribution system is optimized on the other hand (overall efficiency).

An improvement in the overall efficiency can be achieved with the help of a vehicle electrical distribution system management which coordinates the control of the vehicle's electrical system distribution components (e.g., generator, battery(ies), load, voltage regulator, DC/DC converter). Similarly, vehicle electrical distribution system management can reduce the worst-case demands on battery and generator (e.g., starting ability at −25° C.). These rarely occurring cases can be mastered through measures taken by the vehicle's electrical distribution management system (e.g., by increasing the rotational speed level of the drive or by reducing the load power consumption).

It is a object of the present invention to provide the structure of a vehicle electrical distribution system management using which the described requirements can be met and which is incorporated into a hierarchical control structure.

In German Patent Application No. 1 97 45 849.1 of Oct. 16, 1997 (not a prior publication), a vehicle's electrical distribution system management is shown. The power distribution is implemented using a control system which operates as the vehicle's electrical distribution system manager. The data is transmitted to the control unit which, on the basis of this data, implements a strategy for the control of the components of the vehicle electrical distribution system and of the internal combustion engine. The power distribution between the vehicle's electrical distribution system and the internal combustion engine takes place in accordance with requirements that can be specified while taking into account that the vehicle's electrical distribution system target voltage (U_s) lies within specified limits. The actual design of the vehicle electrical distribution system manager and integration into a hierarchical control structure are not described.

The principle of a basic hierarchical structure of an overall vehicle system is known from the German Patent Application No. 1 97 09 317.5 of Mar. 7, 1997, (also not a prior publication). In that application a vehicle coordinator determines the components: drive (source of mechanical power), vehicle movement, body and interior space and vehicle electrical distribution system (source of electrical power). The communication among the individual components of this structure takes place only between the higher-level component and the components assigned to it within the framework of fixed and predefined communication relations. These are the instructions given in principle by a component on a higher hierarchical level to a component on a lower hierarchical level and which are carried out by the assigned component, the request made also by a component on a lower hierarchical level of a component on a higher hierarchical level and which should be filled by the addressed component, and the query to which an answer by the queried component to the querying component is expected. The control of the vehicle takes place within the framework of these specified communication relations between the components. Fixed and predefined physical magnitudes representing interfaces defined between the individual components are transmitted to the control of the vehicle. No design of the coordinator vehicle's electrical distribution system is shown.

SUMMARY OF THE INVENTION

The vehicle's electrical distribution system manager described above makes the control of the vehicle's electrical distribution system possible, and thereby makes it possible to embed the control of the power distribution in a hierarchical overall vehicle structure. Greater control over the entire system and over the power distribution control system is achieved in this manner, and modular development of software becomes thus possible. This is because an object-oriented structure of the vehicle's electrical distribution system manager is specified in accordance with the structure of the overall system.

It is especially advantageous that this structure of the vehicle's electrical distribution system and of the vehicle's electrical distribution system manager is especially simple. The interfaces between the individual components, and the interchanged signals are purely of logical nature, i.e., independent of hardware and implementation (e.g., rotational speed, power, torque, voltage, etc.). The possibility of re-using software and easy expendability, straightforward overview and ease of applicability are the resulting advantages.

It is also an advantage that the vehicle's electrical distribution system coordinator described in greater detail further below, coordinates the interaction among generator, voltage regulator, electrical loads, batteries and, if applicable, DC/DC transformers. Coordination with the power train is provided in a higher-level component (vehicle coordinator) above the coordinator of the vehicle's electrical distribution system. In another embodiment a vehicle's electrical distribution system manager is provided which in addition assumes the role of the higher-level component and also takes the power train into account. A suitable strategy for the production, distribution, storage and utilization of the electrical power is determined. This increases vehicle availability, because the loading balance is assured, the vehicle's electrical distribution system voltage is maintained dynamically and statically within the specified range, the interaction between the vehicle's electrical distribution system and the drive is improved and the life of the battery is extended. At the same time, as a boundary condition, fuel consumption is kept to a minimum.

Due to the structures described below, having a higher-level block coordinating the subordinate subsystem, the subsystems are coordinated optimally. The structure makes a higher-level power management possible.

DETAILED DESCRIPTION

Figure 1:
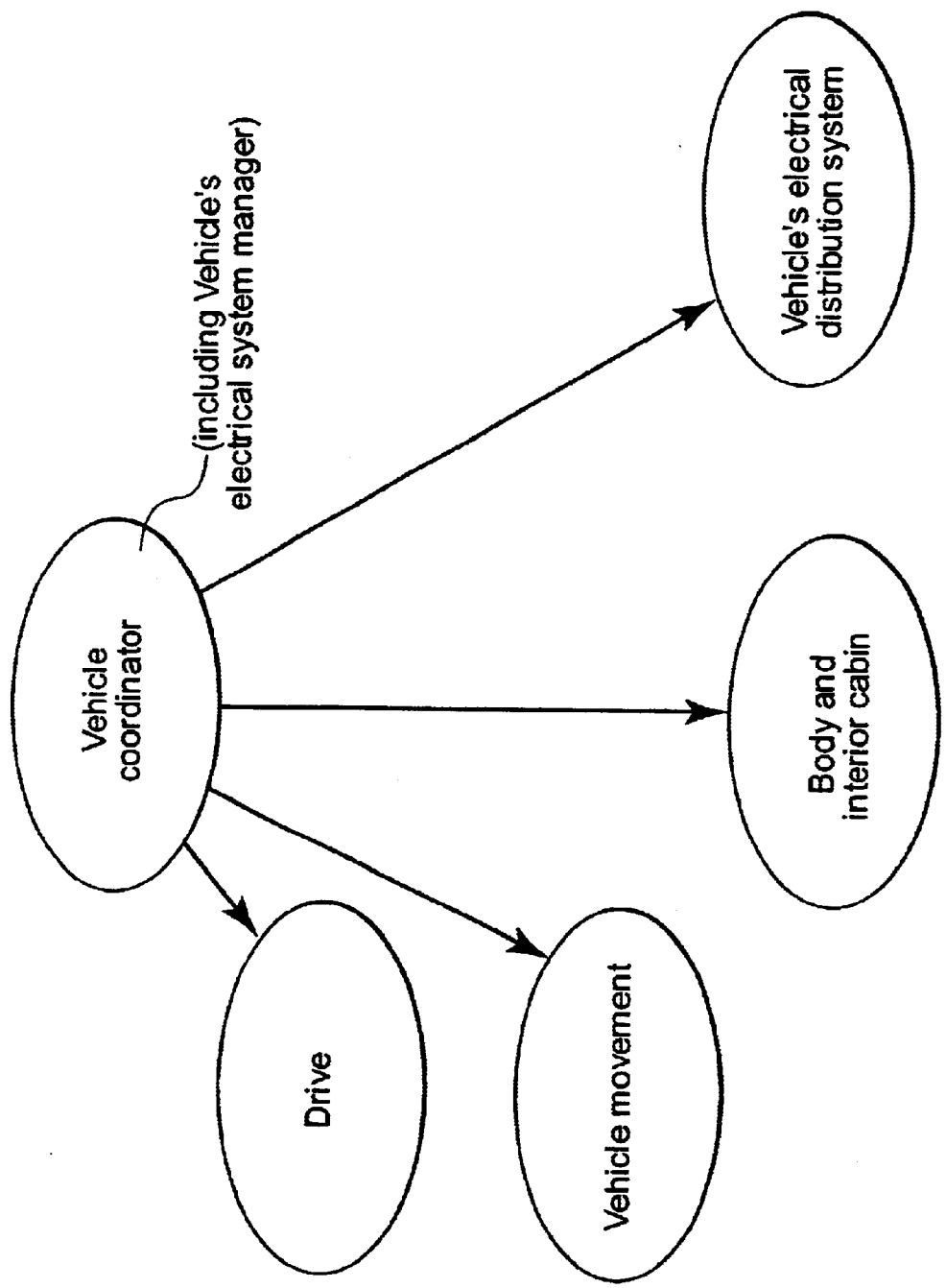
FIG. 1 shows the principle of a basic hierarchical structure of an overall vehicle system.

FIG. 1 shows the principle of a basic hierarchical structure of an overall vehicle system as known from the related art. A vehicle coordinator commands the following components: drive, vehicle movement, body and cabin, and the vehicle's electrical distribution system. The vehicle's electrical distribution system and the appertaining interfaces with the vehicle coordinator are described in further detail below. Depending on the embodiment, the individual components may be implemented in the form of individual control devices or individual software blocks within a control device, or as a combination of designs.

Figure 2:
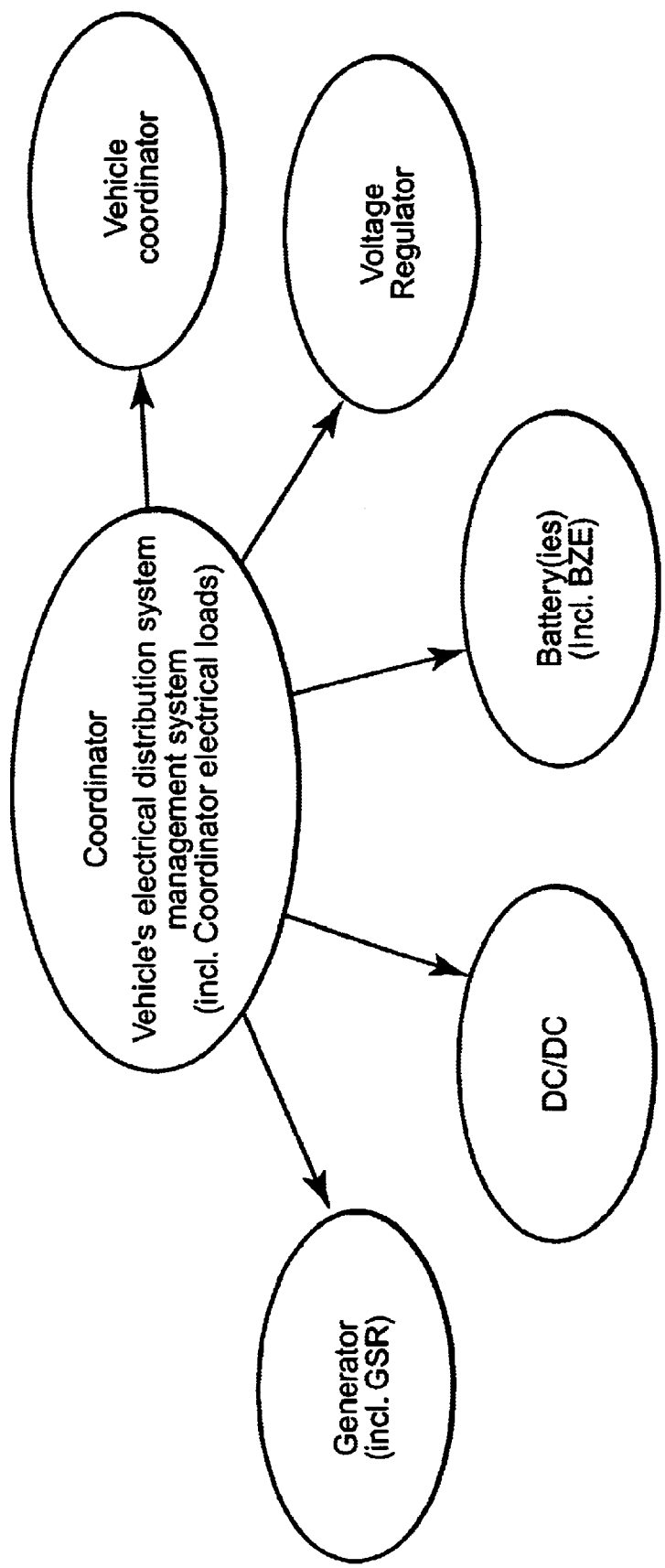
FIG. 2 shows the principle of the refinement of the vehicle's electrical distribution system component.

FIG. 2 shows the principle of the refinement of the vehicle's electrical distribution system component. It is the task of the electrical distribution system to provide electrical power for the electrical loads of the motor vehicle. The additional possibility exists to set a mechanical power using the vehicle's electrical distribution system (via the generator) by controlling the generator excitation and thereby the mechanical power consumption. In special cases it is even possible to provide mechanical power by operating the generator in the motor mode, in which it supplies mechanical power. The adjustment of the mechanical power consumption of the vehicle's electrical distribution system may be used for example to assist the warm-up phase of an internal combustion engine, when the drive requires an additional load torque and thereby shortens the warm-up phase, or to provide an additional braking torque, e.g., in response to a request by the vehicle movement component. The mechanical power output of the vehicle's electrical distribution system can be used as a boost of the drive.

The vehicle's electrical distribution system components (generator and battery) are carry out the tasks of the vehicle's electrical distribution system. Several batteries, e.g., a two-battery electrical distribution system, are possible. For a higher-level vehicle's electrical distribution system management the generator component as well as the battery component are provided with a status recognition (GSR generator status recognition, BSR battery status recognition) so as to be able to provide information on the power potential, e.g., evaluate the battery charge status and the battery age, evaluate the generator temperature, etc., insofar as this data is not already available in the form of measured values. With the multi-voltage vehicle's electrical distribution systems one or several DC/DC converters are required as additional components for the voltage conversion.

The electrical distribution system coordinator controls the electrical distribution system components, i.e., it determines the strategy by which the requirements of the vehicle coordinator are translated into the vehicle's electrical distribution system. The electrical load coordinator is a separate vehicle electrical distribution system component or part of the electrical distribution system coordinator, depending on the design used. Its task is to collect the power requirements of the electrical loads belonging to the vehicle's electrical distribution system component (e.g., heating), requesting these outputs from the vehicle coordinator and assigning the outputs to the loads.

The vehicle's electrical distribution system component voltage regulator is not absolutely required. It is used in a vehicle's electrical distribution system management to keep the voltage of the vehicle's electrical distribution system within a specified range when the generator has reached its capacity limit, i.e., when it can no longer cover the electrical power requirement. It informs the vehicle's electrical distribution system management of the shortfall in required power (calculated from the difference $U_{target}-U_{actual}$ between the vehicle's electrical distribution system target voltage $U_{target}$ and the actual vehicle's electrical distribution system voltage $U_{actual}$). The vehicle's electrical distribution system management then initiates measures which reduce the electrical power requirement (e.g., by switching off electrical loads) or enable a greater production of power, such as, e.g., a change in the generator speed. The voltage regulator can be viewed simply as a virtual electrical load with high priority. The voltage regulator is not identical with the generator regulator which is assigned to the generator and which sets the required vehicle's electrical distribution system voltage by adjusting the generator excitation.

Figure 3:
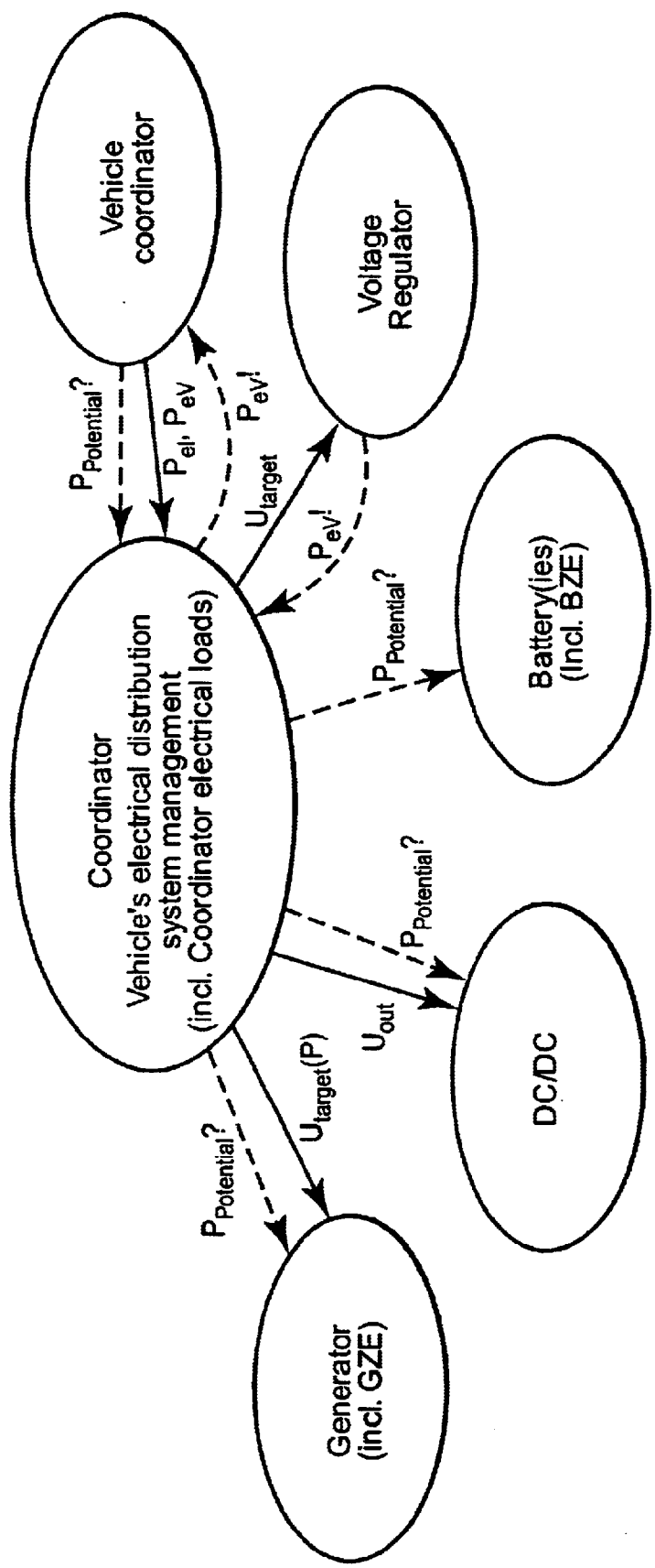
FIG. 3 shows the communication between the components for a request for the supply of electrical power.

FIG. 3 shows the communication between the components for a request for the supply of electrical power. The vehicle queries (query relation) the vehicle's electrical distribution system coordinator to ascertain the potential of supplying electrical power $P_{potential}$, broken down into all existing voltage levels. The query is retransmitted to the generator and to the battery. The potential is indicated in partial quantities having different priorities if needed. The potential of the battery is thus broken down into the battery power (charge or discharge power) which is desirable with regard to the battery, the maximum possible discharge power and the maximum possible charge power, each inclusive of the respective battery voltage. These powers are prioritized depending on the state of the battery. Thus the charge has very high priority in case of a low-charge battery state. At the same time the vehicle's electrical distribution system coordinator queries the potential of the DC/DC converter (if one is present). This potential is limited, e.g., by the limit temperature of the power semi-conductor. This potential can limit the power potential of battery and generator. The electrical power potential is determined, e.g., by evaluating a full load family of characteristics which represents the generator output current plotted against the rotational speed at maximum excitation and at different generator output voltages. The potential of the battery(ies) is found, e.g., by estimating how much power can be obtained from the battery or can be supplied to it at specified voltages which can be derived from the vehicle's electrical distribution system specification. The potential of the DC/DC converter depends on the layout of the converter and on external factors, e.g., temperature. The converter can transmit the power corresponding to its specification, but this is reduced when component temperatures are high. The potential of the converter may be determined, e.g., through a temperature-dependent characteristic curve.

The vehicle's electrical distribution system coordinator interprets the potential indications of battery and generator and gives the vehicle coordinator answers to the query about potential.

The vehicle coordinator then transmits its instruction (instruction relationship) for supply of power (electrical power $P_{e1}$) to the vehicle's electrical distribution system coordinator. The vehicle's electrical distribution system coordinator decides (upon query on supply of power according to the prioritized potential outputs), on the basis of the battery and generator state, on the distribution of the power demand among the different components (e.g., battery and generator) and thereupon instructs the generator to produce the power, specifying a target voltage ($U_{target}$) If the load power is known, then $U_{target}$ corresponds to a certain generator power, i.e., a power P can also be specified instead of $U_{target}$. If the load power is not known precisely, a power other than the target voltage occurs as the power is specified, i.e., the battery power has no longer the desired value. With a specification of $U_{target}$ the generator regulator ensures that so much power is generated that the voltage is set (if possible). The resulting vehicle's electrical distribution system voltage determines the battery power (the battery power cannot be controlled directly but is set as a function of the battery voltage). At the same time the vehicle's electrical distribution system coordinator specifies the output voltages ($U_{out}$) for the DC/DC converters (instruction). Within the framework of the instruction relationship, the vehicle coordinator assigns electrical load power ($P_{e1}$) to be consumed to the vehicle's electrical distribution system coordinator if applicable.

The voltage regulator receives the target voltage value ($U_{target}$) within the framework of a instruction relationship.

It compares it with the actual voltage value and requests virtual electrical power ($P_{ev}$) of the vehicle coordinator via the vehicle's electrical distribution system coordinator for the purpose of equalizing the voltage difference (request relation).

Figure 4:
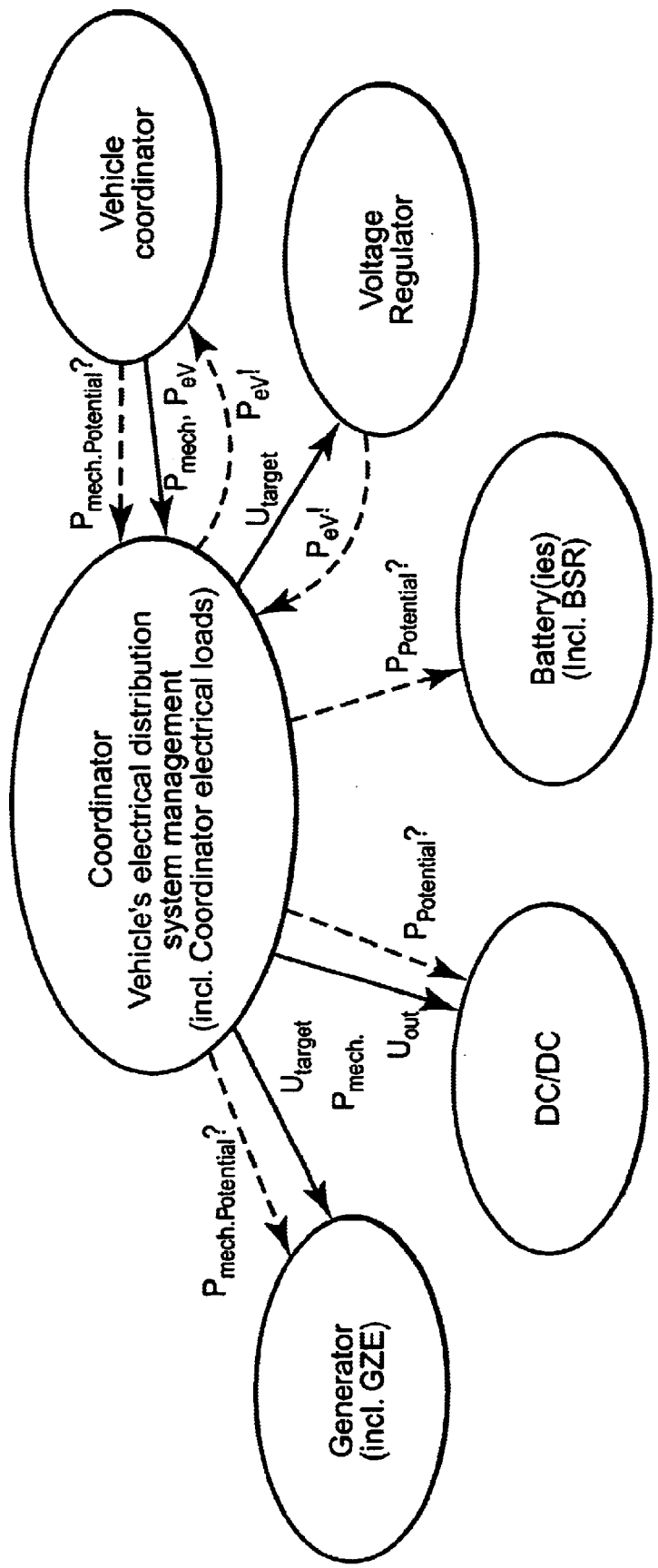
FIG. 4 shows the communication sequence in the case of a request for a mechanical power output ($P_{mech}$) from the vehicle's electrical distribution system.

FIG. 4 shows the communication sequence in the case of a request for a mechanical power output ($P_{mech}$) from the vehicle's electrical distribution system. This power output may be positive (taking up mechanical power) as well as negative (supplying mechanical power).

The vehicle coordinator queries the mechanical power potential ($P_{mech,potential}$) of the vehicle's electrical distribution system. The vehicle's electrical distribution system coordinator queries the mechanical power output potential of the generator, the electrical power output potential of the battery, and the electrical power output potential of the DC/DC converter (query relationships). The potential of the output of mechanical power (producible mechanical power) when the generator is in the motor mode is calculated from the rotational speed at which the power is to be output, and from the vehicle's electrical distribution system voltage ($P_{mech}$=f(n, U)). The rotational speed is communicated upon query (also several values, depending on admissible speed reduction stages). The answer contains at the same time information on the required electrical power. The potential of the consumption of mechanical power is found from the full-load family of characteristics and from the efficiency. Depending on the electrical power demand made on the vehicle's electrical distribution system, the battery, generator and converter potential, the vehicle's electrical distribution system coordinator determines the potential of supplying mechanical power. The latter is again broken down according to different priorities. When output of mechanical power is requested, the battery potential is the delimiting magnitude, as the battery supplies the electrical power for the vehicle's electrical distribution system and the motor mode operation of the generator. A request to receive additional mechanical power signifies increased output of electrical power. If this power cannot be absorbed by the battery, either no additional mechanical output is possible or additional electrical loads are used, i.e., an additional query of the generator via the vehicle's electrical distribution system to the vehicle coordinator must be added: Potential of the electrical load ($P_{ev}$) (how much power can be absorbed in addition). The vehicle coordinator instructs the vehicle's electrical distribution system to supply the mechanical power ($P_{mech}$) The vehicle's electrical distribution system coordinator instructs the generator to set the mechanical power (instruction relationship). This is possible through direct power specification ($P_{mech}$) This power is required, e.g., by the drive from the vehicle coordinator for functions such as warm-up support or through specification of the target voltage ($U_{target}$). $P_{mech}$ is specified in the case of a request for output of mechanical power, $U_{target}$ in the case of a request for absorption of mechanical output. The battery power is set as a function of the vehicle's electrical distribution system voltage.

Voltage regulation etc. takes place in a manner similar to the case of a request for electrical power.

Figure 5:
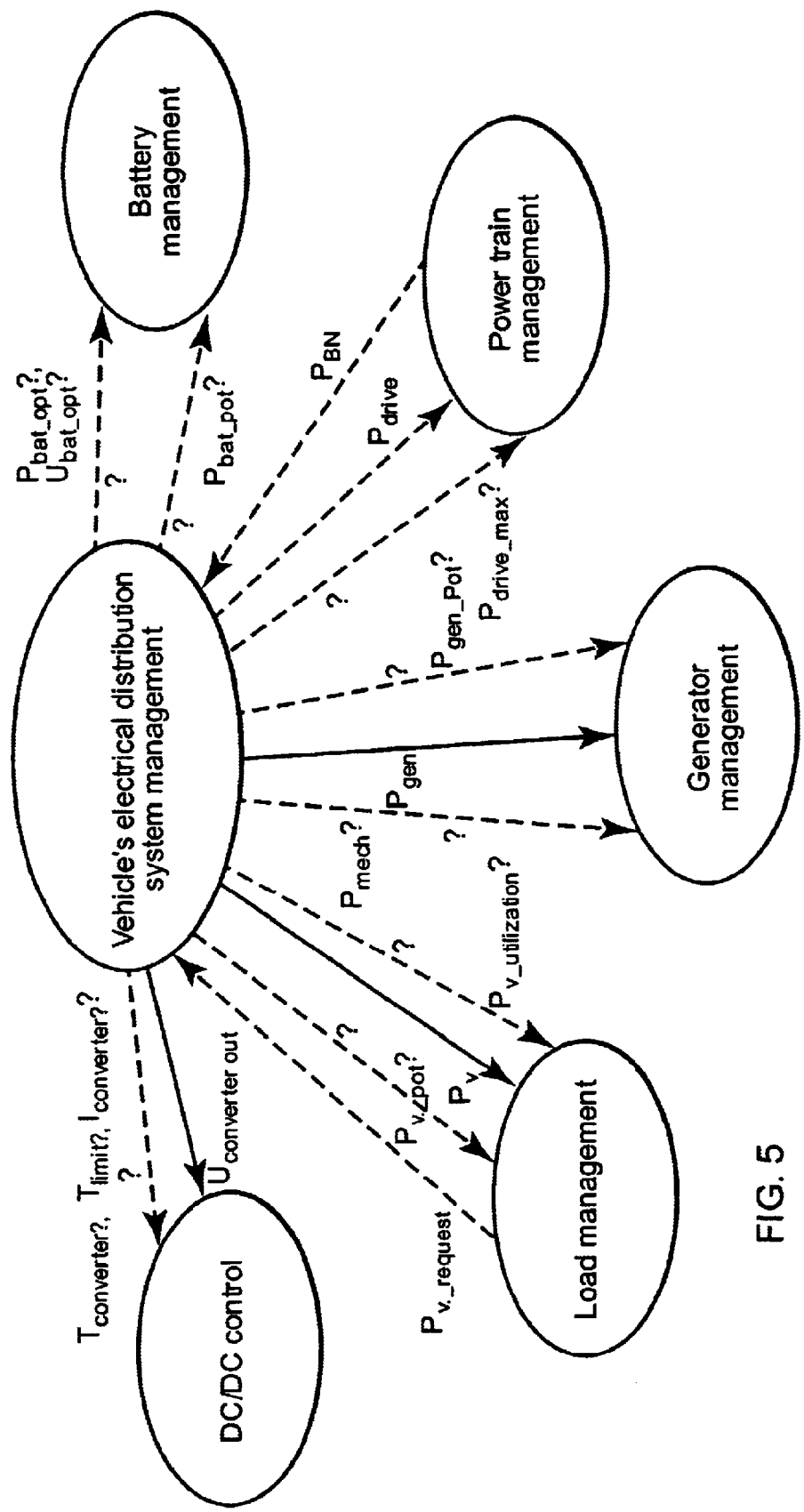
FIG. 5 shows another embodiment according to the present invention.

An additional exemplary embodiment through which the same functionality is attained is described in FIG. 5. Coupling to the overall vehicle system takes place via the load management and power train management component. In the embodiment according to FIGS. 1 to 4, the DC/DC control, generator and battery management constitute the vehicle's electrical distribution system. The load management is distributed in this case among all the components, including the vehicle part, while the power train management in the embodiment according to FIG. 5 represents the interface with the vehicle movement and drive, but depicts only the parts relevant to the vehicle's electrical distribution system.

The vehicle's electrical distribution system coordinator in the embodiment of FIGS. 1 to 4 is therefore not identical with the vehicle's electrical distribution system management described below. The vehicle's electrical distribution system coordinator in the embodiment of FIGS. 1 to 4 is part of a vehicle's electrical distribution system management which is executed mainly in the vehicle coordinator. While the structure according to FIGS. 1 to 4 takes into account the overall vehicle structure, FIG. 5 only shows the part relevant to the vehicle's electrical distribution system.

To be able to coordinate the electrical power generation and utilization, data concerning the generator, battery, drive and load status is used in the embodiment according to FIG. 5. Accordingly the battery management, generator management, power train management, and load management, and the control of the DC/DC converters in case of higher-voltage vehicle's electrical distribution systems are specified as partial components.

The battery is a storage device for electrical energy. It can receive as well as supply power.

The battery management coordinates the operation of all the batteries in the vehicle's electrical distribution system (e.g., a 36 V battery and a 12 V battery). It determines the optimal battery voltage from the point of view of each battery and determines the respective battery power as well as the charge and discharge potential (maximum charge or discharge power). The power indications are weighted in order to emphasize the urgency of a charge or discharge operation. Thus for example, a charge operation is requested with high priority in the case of a critical state of the battery charge; however, power can still be obtained from the battery for safety-relevant loads.

The generator manager calculates the potential of the electrical power generation: the momentary power output, the maximum output power at the instantaneous generator speed, and information on the rotational speed. The latter describes the rotational speed range within which the generator is capable of the maximum power output at full excitation. The mechanical power output potential is also determined: the momentary input of mechanical power and the maximum mechanical power output in motor mode (boost of the vehicle drive; only with power train-coupled starter generator). Similarly, the expected mechanical output required for the generation of an electrical output requested by the vehicle's electrical distribution system management is estimated. The generator management converts the power generation instruction by the vehicle's electrical distribution system management by adjusting the specified target voltage.

Power train management is required for the vehicle's electrical distribution system management because the vehicle's electrical distribution system and the drive influence each other via the generator: The drive determines the instantaneous generator speed and thereby the instantaneous maximum possible electrical power output. The generator on the other hand represents an additional mechanical load for the drive. The rotational speed level of the drive and thus of the generator is decisive for the long-term power balance and is therefore an important value in designing the vehicle's electrical distribution system. The following drive values are important for the design of the vehicle's electrical distribution system: The rotational speed potential and the mechanical power potential. That is to say, to what extent is the drive able to vary its instantaneous rpm (at constant speed) or is the drive capable of supplying mechanical power that is relevant for the generator drive. This is in particular not obvious in full load phases and with generators of the future which are capable of meeting the above-mentioned power requirements. The potential data is weighted, i.e., the drive evaluates the measures relating to the change in rpm or power output with regard to its influence on efficiency, emission, etc., and sets priorities for the different potentials as a function of the result. On the other hand the vehicle's electrical distribution system also influences the drive through the torque reaction. The drive can therefore request power to improve its efficiency from the vehicle's electrical distribution system. This includes increased load on the internal combustion engine due to the generator in low load phases or reduced load due to the generator at full load.

The electrical loads request power via the load management. At the same time the load management has the task of distributing the output of the vehicle's electrical distribution system among the individual loads.

The vehicle's electrical distribution system manager is at a higher level than the above-mentioned components. It compares the power requirements of the electrical loads with the potential of output generation and establishes a strategy for output generation and utilization as a function of the requirements of the different components. Output generation depends here on the priority of the output requirements of the electrical loads, the priority of the battery requests and the priority of the drive requests. The boundary condition here is always that the specific voltage limits may not be exceeded and the battery charge status may never fall below a critical value. The vehicle's electrical distribution system manager determines the generator output to be set, the load power present and the battery output and if necessary requests a different rotational speed level of the drive. It informs the drive of the load response to be expected from the generator before transmitting the instruction for it to generate electrical output. Thereby the engine can prepare for dynamic load changes. Thereafter it issues its instruction for power output and power consumption. The battery voltage is derived from the assigned battery power output. Thus for example, the voltage of the 36 V battery is the target value for the generator output with the 14 V/42 V vehicle's electrical distribution system and thus establishes the generator power output. The 14 V voltage is produced from the 42 V generator voltage via one or several DC/DC converters (network converter, battery converter). This means that the voltage of the 14 V battery is specified to the DC/DC battery converter as the output voltage value (the battery converter may be identical with the network converter). The expected load consumption is assigned to the load management which switches the loads.

From this the following interfaces result between the vehicle's electrical distribution system manager and the partial components:
With the DC/DC converter:
    Query of each type of converter (e.g., network converter, battery converter) concerning converter temperature $T_{converter}$ (determined by measuring) with simultaneous transmission of the maximum temperature (semiconductor limit temperature) $T_{limit}$ according to data sheet and the instantaneous, measured converter current $I_{converter}$. As an instruction, the specification of the output voltage $U_{converter\_}^{out}$ for network converters as well as for battery converters (if present). The output voltage is determined by the vehicle's electrical distribution system manager, e.g., while taking into account the battery voltage to be set;

With the load management:

Request of load power $P_{c\_}^{request}$, whose magnitude is determined, e.g., from fixed values assigned to the different loads.

The query interface represents the add-on potential ($P_{v\_pot}$) of the loads which is obtained from table values by adding up the different non-active loads.

Another query interface is the query as to how much of the preliminarily assigned (broken down by nominal and peak power) power can be utilized ($P_{v\_utilize}$) It too is determined from a table. In one embodiment the latter comprises components for 12 V and 42 V loads. This relates to the case where no continuous power adjustment is possible. If this query does not take place, the vehicle's electrical distribution system management assigns power which is not consumed, resulting in rising vehicle's electrical distribution system voltage.

The instruction interface forms $P_v$ with the components $P_{12V}$, $P_{42}V$. The vehicle's electrical distribution system manager transmits requests via this interface to the load management after setting (decreasing) the load output. The distribution of the power among the different loads takes place in the load management.

With the generator management:

The vehicle's electrical distribution system manager queries the generator management concerning the power generation potential $P_{gen\_}^{pot}$ determined above. This query has, e.g., the following components: the presently produced measured electrical power $P_{actual}$ and the maximum power $P_{max}$ that can be produced. This value depends on the rpm. The maximum power that can be produced is given for the adjustable generator speed which is a function of the rotational speed of the drive and of the reduction ratio between drive and generator. This means that a maximum power output is indicated at the actual generator speed, at the maximum and at the minimum possible rotational speed. A possible over-excitation of the generator is another factor determining the maximum power output. The generator management decides automatically in this case on the boostability of the generator. Subdividing the power value into different classes is possible, e.g., optimum efficiency, power generation, optimum power generation, possible power generation based on thermal status of the generator (over-excitation) limited in time. The time required to make the power available is one boundary condition of the power potential.

In addition, the mechanical power requirement ($P_{mech}$), as determined above, of the generator for a specified electrical power which is to be generated is queried. In vehicles with starter generators coupled to the power train or generators which in motor mode can reinforce or replace the vehicle drive, an expansion of the interface is required. $P_{mech}$ is then the power in motor mode of the electrical machine for a specified rotational speed. $P_{mech}$ is negative in this case (the electrical machine produces power).

The instruction given to the generator for power generation ($P_{gen}$) represents the instruction relationship between vehicle's electrical distribution system and generator. This interface defines an output voltage for the generator which is specified as the target voltage of the generator control. This means that the conversion of the power to be generated into a corresponding voltage can also take place in the vehicle's electrical distribution system manager. This interface then changes into a voltage interface $U_{gen\_out}$.

With the power train manager:

The request addressed to the vehicle's electrical distribution system manager for a mechanical power output $P_{mech}$, e.g., to assist in warm-up (greater load) or as relief during acceleration represents the instruction relationship between vehicle's electrical distribution system management and the power train. The vehicle's electrical distribution system manager determines the attribution of the requested power. The power is adjusted mainly via the generator (mechanical feedback of the electrical power generation). In vehicles with possible drive support through motor-mode operation of the generator, this is also the requirement for supporting power output at a specified rotational speed (corresponds to a torque request). In this case, however, an additional interface is provided: the query by the drive to the vehicle's electrical distribution system for potential, e.g., the mechanical drive potential of the generator at specified rpm ($P_{bn\_}^{P}$).

The query relationship represents the query of the power generation potential of the drive ($P_{drive\_}^{max}$) by the vehicle's electrical distribution system manager. The potential is the maximum power of the drive which is available for the electrical power generation and is obtained from a family of characteristics. A magnitude corresponding to the generator rpm in every instance is a boundary condition here. When the goal is a torque change, the maximum power output at constant generator speed is queried. If the goal is a change in rotational speed, so that the electrical power generation may be improved, the maximum power for a change in rotational speed is communicated. The answer to this query furthermore contains the time during which the potential can be made available.

$P_{drive}$ is yet another request relationship. It represents the request for adjustment of a mechanical power for electrical power generation. Stating the reason for the power requirement is a boundary condition: Changes in power due to changes in rotational speed or changes in power due to change in torque (at constant rotational speed).

With the battery manager:

The query for electrical power output potential $P_{bat\_pot}$ of the battery(ies) and corresponding battery voltage(s), as well as for charge and discharge, i.e., power input and output is provided as a query relationship. The potential is formed as a function of the maximum charge capacity and the charge voltage or the maximum discharge capacity and discharge voltage. Furthermore the request for desired voltage(s) from the point of view of the battery $U_{batopt}$ and the respective power $P_{batopt}$ are provided as a query relationship. The voltage depends on the charge/discharge strategy and on factors affecting battery life.

The components described above are software elements for the management and control of the hardware elements such as generator, battery, DC/DC converter.

What is claimed is:

1. A method for providing a power distribution in a motor vehicle including at least one battery and at least one generator, the method comprising the steps of:

providing a hierarchical control structure having a higher-level component and lower-level components to control the at least one generator and of the at least one battery, the higher-level component including an electrical distribution system coordinator and an electrical distribution system manager;

providing interfaces for a communication exchange between the higher-level component and the lower-level components, the communication exchange including:

instructions that are executable by at least one of the higher-level component and the lower-level components to which the instructions are addressed, requests that are met by the at least one of the higher-level component and the lower-level components to which they are addressed, and queries that are answerable by the at least one of the higher-level component and the lower-level components to which they are addressed;

transmitting one of a power and a voltage to be set as an instruction;

transmitting a potential for a power generation of the at least one generator as a query between at least one of the lower-level components associated with the at least one generator and the higher-level component; and transmitting an electrical power potential of the at least one battery as a query between at least one of the lower-level components associated with the at least one battery and the higher-level component.

2. The method according to claim 1, wherein the potential for the power generation includes an instantaneous electrical power generated by the at least one generator and a maximum producible power.

3. The method according to claim 1, further comprising the step of:

transmitting a mechanical power requirement of the at least one generator as a query from the higher-level component to the at least one generator.

4. The method according to claim 1, further comprising the step of:

transmitting a desired voltage and a desired output for each of the at least one battery as a query from the higher-level component to the at least one battery.

5. The method according to claim 1, further comprising the steps of:

providing at least one DC/DC converter as a component;

transmitting an output voltage of the at least one DC/DC converter as an instruction; and transmitting an output potential as a query between the at least one DC/DC converter and the higher-level component.

6. The method according to claim 1, further comprising the steps of:

providing at least one DC/DC converter as a component;

transmitting an output voltage of the at least one DC/DC converter as an instruction; and transmitting a converter current, a converter temperature, and a limit temperature as a query between the at least one DC/DC converter and the higher-level component.

7. The method according to claim 1, further comprising the steps of:

providing at least one regulator of an electrical distribution system of the vehicle as a component;

transmitting a target voltage between the at least one regulator and the higher-level component as an instruction; and transmitting an electrical output as a request from the at least one regulator to the higher-level component.

8. The method according to claim 1, further comprising the steps of:

providing a vehicle coordinator above the higher-level component for receiving a transmission including at least one of a supply of electrical power to be consumed, a mechanical power to be consumed, and an electrical load power to be consumed;

causing the vehicle coordinator to transmit as a query a potential of at least one of an electrical power supply and a mechanical power supply; and transmitting electrical power as a request as necessary.

9. The method according to claim 1, further comprising the steps of:

providing a load management component that requests a load power from the higher-level component;

causing the higher-level component to query the load management component with respect to an add-on potential of a plurality of loads; and causing the higher-level component to transmit the load power to be set as an instruction.

10. The method according to claim 1, further comprising the steps of:

providing a power train management component that requests a mechanical power from the higher-level component;

causing the higher-level component to query from the power train management component the potential for the power generation; and causing the higher-level component to request from the power train management component the mechanical power that is to be set.

11. The method of claim 10, further comprising:

adjusting the mechanical power to one of assist a warm-up phase of an internal combustion engine of the motor vehicle and to provide an additional braking torque.

12. A device for providing a power distribution in a motor vehicle that includes at least one battery and at least one generator, comprising:

a hierarchical control structure including a higher-level component and at least one lower-level component to control the at least one generator and the at least one battery;

interfaces for communicating between the higher-level component and the at least one lower-level component;

an arrangement for communicating instructions that are executable by at least one of the higher-level component and the at least one lower-level component to which the instructions are addressed;

an arrangement for communicating requests that are met by the at least one of the higher-level component and the at least one lower-level component to which the requests are addressed; and an arrangement for communicating queries that are answerable by the at least one of the higher-level component and the at least one lower-level component to which the queries are addressed, wherein:

the at least one lower-level component includes a generator component for the at least one generator and a battery component for the at least one battery;

the interfaces include an interface arranged between the generator component and the higher-level component to communicate a power and voltage to be set as an instruction and potential for a power generation of the at least one generator as a query; and the interfaces further include an interface arranged between the battery component and the higher-level component to communicate an electrical power potential of the at least one battery as a query.

13. The device of claim 12, wherein the interfaces are hardware-independent.

14. The device of claim 12, wherein a loading balance is maintained for the at least one battery.

15. The device of claim 12, wherein a life of the at least one battery is extended.

16. The device of claim 12, wherein a fuel consumption of the motor vehicle is minimized.

17. The device of claim 12, wherein the generator component includes a generator status recognition arrangement.

18. The device of claim 12, wherein the battery component includes a battery status recognition arrangement.

* * * * *

UNITED STATES PATENT AND TRADEMARK OFFICE
CERTIFICATE OF CORRECTION

PATENT NO. : 6,679,344 B1
DATED : January 20, 2004
INVENTOR(S) : Torsten Bertram et al.

It is certified that error appears in the above-identified patent and that said Letters Patent is hereby corrected as shown below:

Column 1,
Line 30, change "...system is" to -- ...system are --
Line 62, change "time signif-" to -- time a signifi --

Column 2,
Line 13, change "a object" to -- an object --

Column 4,
Line 21, change "are carry out" to -- carry out --

Column 5,
Line 56, change "resulting vehicle's" to -- vehicles's resulting --
Line 67, change "a instruction" to -- an instruction --

Column 8,
Line 4, change "speed)" to -- speed), --
Line 5, change "drive." to -- drive? --
Line 67, change "$U_{converter\_}{}^{out}$" to -- $U_{converter\_out}$ --

Column 9,
Line 5, change "$P_c{}^{request}$" to -- $P_{c\_request}$ --
Line 19, change "in rising vehicle's" to -- in a rise in the vehicle's --
Line 67, change "$U_{gen\text{-}out}$." to -- $U_{gen\_out}$. --

Column 10,
Line 6, change "vehicle's" to -- the vehicle's --
Line 16, change "$P_{bn\_}{}^{P}$" to -- $P_{bn\_P}$ --
Line 18, change "$P_{drive\_}{}^{max}$" to -- $P_{drive\_max}$ --
Line 44, change '$U_{battopt}$" to -- $U_{batopt}$ --

UNITED STATES PATENT AND TRADEMARK OFFICE
CERTIFICATE OF CORRECTION

PATENT NO. : 6,679,344 B1
DATED : January 20, 2004
INVENTOR(S) : Torsten Bertram et al.

It is certified that error appears in the above-identified patent and that said Letters Patent is hereby corrected as shown below:

Column 10 (cont'd),
Line 57, change "and of the" to -- and the --

Signed and Sealed this

Ninth Day of November, 2004

JON W. DUDAS
*Director of the United States Patent and Trademark Office*